Patented Nov. 10, 1936

2,060,625

UNITED STATES PATENT OFFICE 2,060,625

PROCESS OF PREPARING SELF-HARDENING COMPOSITIONS AND PRODUCTS OBTAINABLE THEREBY

Georg Kränzlein, Frankfort-on-the-Main-Hochst, and Richard Karl Müller, Bad Soden, Germany assignors to I. G. Farbenindustrie Aktiengesellschaft, Frankfort-on-the-Main, Germany No Drawing. Application June 29, 1934, Serial No. 733,130. In Germany February 9, 1931

9 Claims. (Cl. 134—26)

The present invention relates to a process of acting upon a soluble phenol-aldehyde resin with metal oxides, applying the resins containing the metal oxides on a surface and to the new products and articles of manufacture obtainable by this process.

We have found that self-hardening masses can be obtained by the addition of red lead, cadmium oxide or a mixture of these oxides to soluble phenol-aldehyde resins. It may be advantageous to mix the oxide and the resin in the presence of an organic solvent, such as alcohol, methylcyclohexanon or the like. It is, however, also possible to use the phenol-formaldehyde condensation product in the form of an aqueous suspension as it is obtainable during the condensation process without the addition of an organic solvent.

This process is particularly suitable for the manufacture of self-hardening lacquers. The lacquers prepared with the aid of metal oxides and the resins containing hydroxyl pass, without further treatment, such as heating or the like, from the form of a heterogeneous, liquid capable of being spread or sprayed, into a substantially homogeneous solid condition.

Unlike the drying process of the known oil varnishes, the hardening of the lacquers consists in a setting, a kind of cementation. The phenols and aldehydes serving as starting materials are easily obtainable in large quantities; the manufacture of the new lacquers is, therefore, simple and economic. There are principally suitable for the invention the phenol-formaldehyde condensation products prepared under alkaline conditions and capable of being hardened, in so far as they still are in a soluble condition. Phenol aldehyde resins prepared by an acid condensation may likewise be used for the process. Furthermore, if the new cementation lacquers are used, for instance for protecting iron, it is a particularly valuable advantage that in this case, too, there may advantageously be used red lead which is well known to have a specific action in preventing rust in hitherto known oil varnishes. A further advantage of the new cementation lacquers lies in the fact that they maybe diluted with cheap solvents or inert filling agents or both, for instance alcohol, a mixture of methyl alcohol and alcohol, methylene chloride, methoxybutanol, methylcyclohexanon, pulverized asbestos, graphite, or the like. The usual softening agents, for instance chlorinated diphenyl, may be added to the lacquers. If inert substances, for instance graphite, are added and particularly if dispersed red lead is used, there are obtained lacquers which have a relatively slight tendency towards sedimentation and can readily be mixed again by stirring even after having been allowed to stand for a long time.

The lacquers may be applied by brushing, spraying, dipping, or the like. The coatings are particularly adherent and resistant to atmospheric conditions and are especially fast to acid. They have been found to be particularly suitable for protecting surfaces which are to be exposed to hydrochloric acid gases, chlorine vapors, sulfuric acid vapors. In this respect they are far superior to coatings prepared by means of oil, oil varnish, bitumen or the like. The process is likewise applicable with advantage for the preparation of primer coatings with or without further filling agents because the solvent of the covering layer which is to be applied thereon dissolves only slightly or scarcely at all the primer coating after this has been hardened by exposure to air. For producing the top coating there may be used a lacquer of a similar composition or an oil or oil-varnish. Furthermore, a top coating of chlorinated rubber has been found suitable.

The paintings of phenol resin and red lead or cadmium oxide are absolutely insoluble in a number of organic solvents, for instance benzine, benzene, or the like. They are also completely insensitive to oil. They may be used for painting iron parts, as well as wood, masonry and walls. They are suitable for painting of hot iron parts, such as steam pipes for protecting them against corrosion.

The products described herein may be used not only for the preparation of lacquers but also for the preparation of self-hardening masses of all kinds capable of being shaped; furthermore, for the preparation of cements or coatings of all kinds. The phenol-aldehyde resins hardened with the aid of red lead or cadmium oxide or a mixture of the two metal oxides are brownish to red masses which will withstand a heating to a temperature of between 150° C. and 200° C.; they are insoluble in most organic solvents, especially in benzene, insensitive to oil and fast to acid vapors. They are distinguished particularly by a good adherence to iron surfaces.

The following examples serve to illustrate the invention, but they are not intended to limit it thereto, the parts being by weight:

(1) 200 parts of red lead are intimately mixed with 268 parts of a phenol-formaldehyde condensation product (in the form of an alcoholic solution of 75 per cent. strength), with addition of 64 parts of alcohol. There is produced a lacquer which is capable of being applied by brushing and hardens after application; external supply of heat being unnecessary. The coating is so dry even after one day, that a further coating of the same lacquer may be applied. Instead of this coating there may also be applied one or two oil coatings as covering layer.

(2) 200 parts of dispersed red lead are intimately mixed with a solution of 200 parts of a phenol-formaldehyde condensation product in 105 parts of alcohol with addition of 35 parts of methylcyclohexanon. The lacquer so obtained yields highly lustrous coatings which likewise harden by exposure to air without application of heat..

The afore-named lacquers are particularly suitable for producing primer coatings if red lead is added; they may, however, also be used in the same manner for producing top coatings.

In order to impart other shades to the lacquers colored pigments may also be added.

(3) A dark brown shade is, for instance, obtainable by adding to the lacquer of the composition described in Example 1, 9 per cent. of lampblack, for instance so-called Frankfort black.

If white lead is used, very light colored coating materials may be produced which may likewise be mixed in the usual manner. Yellowish coatings are obtained if lead oxides are used.

(4) 800 parts of red lead are intimately ground with a solution of 200 parts of a phenol-formaldehyde condensation product (prepared by a condensation in an alkaline solution and a subsequent neutralization) in 200 parts of alcohol and mixed with such a quantity of a diluent (consisting of a mixture of ethyl glycol and alcohol in the proportion of 1:1) that a lacquer is produced capable of being applied easily by brushing. This lacquer is suitable for producing primer coatings and top coatings and may be mixed with other pigments.

(5) 200 parts of phenol-formaldehyde condensation—prepared by condensing phenol with a solution of formaldehyde of 30 per cent. strength with addition of a base (for instance ammonia, piperidine or the like) as a catalyst and distilling the water under reduced pressure after the condensation is complete—are immediately diluted with 200 parts of alcohol and the solution is triturated with 200 parts of cadmium oxide powder. There is produced a brown lacquer capable of being applied easily by brushing. It may be used for producing primer coatings or top coatings.

(6) 500 parts of red lead are intimately mixed with 500 parts of an aqueous suspension of about 68 per cent. strength of a phenol-formaldehyde condensation product such as is obtainable during the condensation process. There is produced a lacquer which is capable of being applied easily by brushing and hardens completely after the water has evaporated; an application of heat is unnecessary.

(7) 100 parts of a phenol-formaldehyde condensation product prepared by condensation of 2 mols of phenol crystals with 1 mol. of formaldehyde in an acid medium are dissolved in 100 parts of alcohol. The solution obtained is triturated with 300 parts of red lead. The further treatment is the same as described in the preceding examples.

(8) 28 parts of cadmium oxide are intimately mixed with 10 parts of a solution of 75 per cent. strength of phenol and formaldehyde resin. The cement-like mass obtained may be used for cementing or as a substitute for putty.

(9) Into 120 parts of an alcoholic solution of phenol resin (of 42 per cent. strength) there are introduced, while stirring, 15 parts of red lead and 15 parts of cadmium oxide. The lacquer obtained is used as above described.

(10) Into 100 parts of a neutral solution of a phenol resin of 50 per cent. strength prepared by the condensation of phenol and formaldehyde in an acid solution there are introduced, while stirring, 250 parts of red lead and the whole is diluted with 10 parts of ethyl-glycol. A lacquer is produced which may be used as above described.

(11) 200 parts of a solution of a phenol resin of 50 per cent. strength containing alcohol as a solvent (prepared by an alkaline condensation of 1 part of phenol with 1.4 parts of formaldehyde in a weakly alkaline solution) are triturated with 200 parts of dispersed red lead and 200 parts of graphite. There are obtained lacquers which are capable of being applied by brushing and can be mixed by stirring without any difficulty after having been allowed to stand for a long time. The coatings are capable of receiving a high polish.

We claim:

1. A composition capable of self-hardening at atmospheric temperature comprising an alcohol-soluble phenol-aldehyde resin and a metal oxide of the group consisting of red lead and cadmium oxide in an amount sufficient for hardening the resin by reaction therewith.

2. A lacquer capable of self-hardening at atmospheric temperature comprising an alcohol-soluble phenol-aldehyde resin and a metal oxide of the group consisting of red lead and cadmium oxide in an amount sufficient for hardening the resin by reaction therewith.

3. A lacquer capable of self-hardening at atmospheric temperature comprising a resole and a metal oxide of the group consisting of red lead and cadmium oxide in an amount sufficient for hardening the resin by reaction therewith.

4. A composition comprising a hard reaction product of an alcohol-soluble phenol-aldehyde resin and a metal oxide of the group consisting of red lead and cadmium oxide, said composition being of a brown to red color, insoluble in water, benzene and benzine, insensitive to oil and fast to acid vapors.

5. A composition comprising a hard reaction product of a resole and a metal oxide of the group consisting of red lead and cadmium oxide, said composition being of a brown to red color, insoluble in water, benzene and benzine, insensitive to oil and fast to acid vapors.

6. A composition comprising an inert filling agent and a hard reaction product of a resole and a metal oxide of the group consisting of red lead and cadmium oxide, said composition being of a brown to red color, insoluble in water, benzene and benzine, insensitive to oil and fast to acid vapors.

7. The process which comprises reacting at substantially atmospheric temperature an alcohol-soluble phenol-aldehyde resin with a sufficient quantity of a metal oxide of the group consisting of red lead and cadmium oxide to harden the resin.

8. A lacquer comprising an intimate mixture of 200 parts of red lead, 268 parts of a 75% alcohol solution of a phenol-fomaldehyde condensation product and 64 parts of alcohol.

9. A lacquer comprising 800 parts of red lead intimately ground with a solution of 200 parts of a phenol-formaldehyde condensation product, prepared by condensation in an alkaline solution and subsequent neutralization, in 200 parts of alcohol and mixed with a sufficient quantity of a diluent, consisting of a mixture of ethyl glycol and alcohol in the proportion of 1:1, to produce a lacquer capable of being applied by brushing.

GEORG KRÄNZLEIN.
RICHARD KARL MÜLLER.